United States Patent Office 3,249,636
Patented May 3, 1966

3,249,636
PROCESS FOR MAKING N,N'-DIALKYLAMIDES OF AROMATIC DIBASIC ACIDS
Ralph E. Close, Moorestown, N.J., assignor to E. I. du Pont de Nemours and Company, Wilmington, Del., a corporation of Delaware
No Drawing. Filed Jan. 14, 1963, Ser. No. 251,033
8 Claims. (Cl. 260—558)

This invention relates to N,N'-dialkylamides of aromatic dicarboxylic acids and, more particularly, to a method of preparing the same.

Chemical blowing agents which release gaseous nitrogen frequently are used in the manufacture of foamed or blown polymeric materials such as natural and synthetic elastomers, polyvinyl chloride compositions, and the like. An especially effective and useful class of such blowing agents is composed of the N,N'-dinitroso-N,N'-diakyl amides of aromatic dicarboxylic acids, as described in United States Patent No. 2,754,326.

Preparation of the intermediate N,N'-diakylamides, more specifically N,N'-dimethyl terephthalamide as described in Industrial and Engineering Chemistry, vol. 49, p. 723, for April 1957, involves the reaction of monomethyl amine with terephthalic acid, terephthaloyl chloride, or dimethyl terephthalate. As starting materials, dimethyl terephthalate and monomethyl amine are especially attractive because of their convenience in use and their ready availability on a large scale. Conventionally, the reaction of the dimethyl ester with monomethylamine is carried out in methanol at or near its normal boiling point. Other N,N'-dialkylamides similarly may be made by reaction of a monoalkylamine with an ester of the desired aromatic dicarboxylic acid.

Amidation by reaction of esters of aromatic dicarboxylic acids with alkyl amines as conventionally carried out, however, suffers from inherent drawbacks such as large volume of equipment due to relatively low solubility of the esters and to loss of the monoalkylamine from the hot solvent, both of which limitations impose unnecessary economic penalties on the production of the desired N,N'-dialkyl amides.

In accordance with the present invention, the disadvantages heretofore encountered in preparing N,N'-dimethyl and N,N'-diethyl amides of isophthalic acid and terephthalic acid can be overcome by a process which comprises dissolving the dimethyl or diethyl ester of said acid in the corresponding alkanol at 80 to 120° C. under autogenous superatmsopheric pressure, adding at least two moles of the corresponding monoalkylamine per mole of said dialkyl ester, maintaining said temperature and pressure for at least 15 minutes thereafter, cooling the mixture to a temperature below the normal boiling point of the alkanol, separating the solid N,N'-dialkyl amide from the reaction mixture, and reusing the mother liquor in a subsequent cycle of the process.

In the reactions described above, the principal by-product is the alcohol corresponding to the alkyl group of the ester used as the starting material. Thus, if dimethyl terephthalate is used in the reaction, two moles of methanol are produced for each mole of N,N'-dimethyl terephthalamide. Likewise, if diethylisophthalate is used as the starting material, two moles of ethanol are produced for each mole of N,N'-diethylisophthalamide. Hence, it is preferable, but not essential, to use as a reaction medium the alkanol corresponding to the alkyl group of the ester which is employed as starting material. By so doing, the composition of the reaction medium remains substantially the same, the medium can be reused cycle after cycle, and solvent removed with the crystalline product is in part or fully replaced by the same solvent generated in the amidation reaction.

An anhydrous reaction system is preferred, but a moderate concentration of water, up to 15%, can be tolerated. Because methanol can easily be obtained and maintained in the anhydrous or near anhydrous condition, and methyl esters of the aromatic dicarboxylic acids are more readily available as starting materials, methanol as a reaction medium, and N,N'-dimethyl amides as products are preferred in the process of the instant invention.

An advantage of the present process over the conventional process for making the N,N'-dialkylamides of isophthalic acid and terephthalic acid is the greatly reduced solvent-requirement if the process is carried out at a temperature above the atmospheric boiling point of the alkanol employed as reaction medium. The solubility of the esters of the dicarboxylic acids increases with increases in temperature so that the amount of reaction medium required to dissolve the ester is reduced, and hence smaller equipment may be employed to obtain the same through-put as is achieved in the conventional process. Whereas about 20 parts by weight of methanol are required to dissolve dimethylterephthalate at 60° C., only 2½ parts of methanol are required at 100° C., and only one part is required at 120° C. Having the ester all in solution is advantageous since the reaction takes place more quickly in solution, and particles of ester are not coated over by the relatively insoluble dialkyl amide. A purer product thereby is obtained. While the process may be carried out at elevated temperatures with as little as one part by weight of solvent per part of dialkyl ester, the mechanical handling of the slurry is more satisfactory if more liquid is present in the reaction mixture and up to 5 parts by weight of alkanol per part of ester is present in the reaction mixture. A ratio of 2.5 to 3.0 parts of solvent per part of ester is preferred.

Operation under superatmospheric pressure in a closed system in accordance with the present invention contributes a further advantage in conservation of materials. In the conventional atmospheric pressure process of amidation, use of 15 to 25% excess of monoalkylamine is common, part of the excess amine being lost by vaporization because of the reduced solubility of the amine in the reaction mixture at its atmospheric boiling point. In the process of the instant invention, however, not more than 6% excess of monoalkylamine over the theoretical amount is required. This amount serves to replace the small amount of monomethyl- or monoethylamine which is removed from the system by separation of the solvent-wet crystalline reaction product. Solvent losses also are minimized by operating in a closed system under pressure.

Increased rate of reaction also is achieved in the process of the instant invention at the temperatures of 80°–120° C. which also are desirable to minimize solvent requirements, as described above. Temperatures of about 100° C. are preferred. Although as noted above, substantially anhydrous conditions are preferred, a moderate concentration, up to about 15%, of water can be tolerated. Excessive quantities of water may lead to hydrolysis of the ester, formation of undesirable by-products, and reduction in yield of N,N'-dialkylamide, especially at temperatures above 125° C. A temperature of about 100° C. again is preferred since it gives an adequate rate of reaction without excessive by-product formation. Amidation is complete in 15 to 60 minutes at 100° C., and relatively smaller time-advantages result at appreciably higher reaction temperatures, especially above 120° C.

The particles of N,N'-dialkylamide as produced are very small, but these agglomerate into readily filterable masses during the reaction time in the preferred temperature range and during the subsequent cooling prior to separation of the solid from the mother liquor, so that easy separation of the solid from the liquid is achieved by centrifugation, filtration, sedimentation, or combinations of these or other techniques.

If accumulation of water in the reaction system is not excessive, the liquid portion of the reaction mixture can be used repeatedly after separation of the desired N,N'-dialkylamide. Recycle of the reaction medium is an essential feature of the preferred process because of the economies of materials and of reaction product which recycle affords. Yields of N,N'-dialkylamide exceed 90% of theory in production operations under preferred conditions if the mother liquor is recycled in the process. A yellow color gradually develops in the mother liquor but does not interfere with the operation of the process or reduce the utility of the product obtained thereby.

The space-time yield in the manufacturing operation, that is the pounds of product per hour per gallon of capacity of the reactor, is increased from 2½ to 5-fold or even more by operating at the elevated temperatures and pressures of this invention as compared with conventional operation at atmospheric pressure.

The invention will be more readily understood by considering the following examples.

*Example 1*

A number of reactions are carried out by substantially the following procedure: 550 g. of liquid reaction medium (methanol, or typical recycle mother liquor containing about 18% of monomethylamine (MMA), 73% methanol, 5% H$_2$O and 4% of dissolved dimethylterephthalate (DMT) or its equivalents) and 200 g. of flaked DMT are placed in a one-gallon autoclave fitted with internal coils. The autoclave is closed, flushed with nitrogen to remove air, and the contents stirred and heated to the operating temperature. Liquid MMA (68 g. for a mole ratio of 2.13) is pumped into the autoclave in 0.5 to 1.0 minute. Water is circulated through the cooling coil to control the temperature at the desired level. The autoclave charge is held at the desired temperature and pressure for at least 15 minutes, then cooled below the normal boiling point of the alkanol in the reaction medium, the solid is separated by filtration, the mother liquor is retained for reuse, the N,N'-dimethylterephthalamide is washed with water and, if desired, dried and analyzed.

Experimental data obtained under a variety of conditions are shown in the table below.

with its attendant economic advantages is entirely practicable.

The crude N,N'-dimethylterephthalamide may be dried or it may be used in the water-wet condition for the manufacture of the blowing agent described in U.S. Patent No. 2,754,326. When dried, the crude N,N'-dimethylterephthalamide is a white crystalline material containing 13.6 to 14.4% nitrogen (14.6% theoretical) and melting at 310–312° C. (uncorrected; copper block method). It is poorly soluble in most common solvents, but is soluble in nitric acid of a range of concentrations and is suitable for nitrosation to form the previously known blowing agent. In steady cycle-after-cycle manufacture, the average purity of the crude N,N'-dimethyl terephthalamide made by the process of the instant invention is somewhat higher (14.0% N) than when made by the conventional process (13.6% N).

*Example 2*

This example illustrates the increase in space-time yield which can be achieved by the improved process of the instant invention when carried out on an industrial scale, as compared with the conventional process for manufacture of N,N'-dimethylterephthalamide. The general procedure is like that described in Example 1, the process conditions for a reactor of given operating volume being given in the table below.

|  | Conventional Process | Process of this Invention |
|---|---|---|
| Recycle filtrate, parts by weight | 1710 | 1260 |
| Dimethylterephthalate charged, parts by weight | 100 | 500 |
| Monomethylamine charged, parts by weight | 57 | 170 |
| Pressure, p.s.i. | 14.7 | 115 |
| Reaction temperature, °C | 60 | 100 |
| Reaction time, hours | 1¾ | 1 |
| Total cycle time, hours | 4 | 3 |
| N,N'-dimethylterephthalamide made, parts by weight | 92 | 468 |
| Space-time yield of product, parts by weight per hr. per cu. ft. | 0.55 | 3.74 |

The total cycle time includes charging, reacting, cooling, and discharging so that the reactor is ready for reuse. By the process of the present invention, the productivity of the reactor is increased more than six fold in terms of the pounds of N,N'-dimethylterephthalamide made per hour per cubic foot of reactor volume.

*Example 3*

Following the procedure of Example 1, but using di-

| Trial | Pressure, p.s.i.g. | Temp. (°C.) | Reaction Time (min.) | Liquid/DMT (wt. ratio) | Kind of Liquid | MMA/DMT (moles) | DMTA Yield, percent |
|---|---|---|---|---|---|---|---|
| 1 | 100 | 100 | 30 | 7 | Fresh methanol | 10 | 63.8 |
| 2 | 100 | 100 | 60 | 7 | do | 10 | 71.8 |
| 3 | 100 | 100 | 120 | 7 | do | 9.4 | 80.2 |
| 4 | 100 | 100 | 30 | 2.75 | Recycled filtrate | 2.13 | 91.2 |
| 5 | 100 | 100 | 60 | 2.75 | do | 2.13 | 99.0 |
| 6 | 100 | 100 | 120 | 2.75 | do | 2.13 | 95.4 |
| 7 | 80 | 80 | 60 | 2.75 | do | 2.13 | 87.5 |
| 8 | 350 | 120 | 60 | 2.75 | do | 2.13 | 95.7 |
| 9 | 100 | 100 | 16 (hrs.) | 2.75 | do | 2.13 | 85.7 |
| 10 | 350 | 120 | 120 | 2.75 | do | 2.13 | 79.6 |

DMT = dimethylterephthalate.
MMA = monomethylamine.
DMTA = N,N'-dimethylterephthalamide.

The tabulated results emphasize the importance of reaction temperature as a process variable since the liquid/DMT weight-ratio, operating pressure required to keep the ingredients in the liquid phase, and the reaction time all are related to the operating temperature, as described heretofore. The series of experiments also shows that improved yields are obtained by using recycle filtrate instead of fresh solvent medium, and that recycle of filtrate ethylterephthalate, ethyl alcohol and monoethylamine instead of the corresponding methyl compounds, the product is N,N'-diethylterephthalamide. This is a white crystalline solid having a melting point of 260–261° C. and a nitrogen content of 12.6% (theory = 12.73% N).

*Example 4*

Following the procedure of Example 3 but using dimethylterephthalate, ethyl alcohol and monoethylamine at a temperature of 130° C. for 4 hours, the reaction product is N,N'-diethylterephthalamide of melting point 260–261° C. and identical with the product from Example 3.

Example 5

Following the procedure of Example 1, but using dimethylisophthalate instead of dimethylterephthalate, the product is N,N'-dimethylisophthalamide. This is a white crystalline solid having a melting point of 188–190°, containing 14.1% N (theory=14.6%), insoluble in benzene, somewhat soluble in water, ethanol, acetone and dioxane, and soluble in strong nitric acid.

Although the above examples are illustrative of batch process operation, it will be apparent to one skilled in the art that the process conditions are such as to permit operation in a continuous manner. Accordingly, continuous processing also is within the scope of the present invention.

Since many variations may be made with respect to details of the process of the present invention, it is to be understood that the invention is limited only by the following patent claims.

What is claimed is:

1. A process for preparing an N,N'-dialkylamide of an acid from the group consisting of isophthalic acid and terephthalic acid, said process comprising dissolving an ester selected from the group consisting of dimethyl isophthalate, dimethyl terephthalate, diethyl isophthalate, and diethyl terephthalate in the corresponding alkanol wherein the ratio by weight of alkanol to dialkyl ester is from 1 to 5 parts alkanol per part ester at 80 to 120° C. under autogenous superatmospheric pressure, adding at least two moles of the corresponding monoalkylamine per mole of said ester, maintaining said temperature and pressure for at least 15 minutes thereafter, cooling the mixture to a temperature below the normal boiling point of said alkanol, separating the solid N,N'-dialkylamide from the reaction mixture, and reusing the mother liquor in a subsequent cycle of the process.

2. The process of claim 1 in which the alkanol is mother liquor from a previous charge containing not more than 15% of water.

3. The process of claim 1 in which the molar ratio of monoalkylamine to ester is from 2.0 to 2.5.

4. The process of claim 1 in which the ester is dimethylterephthalate, the alkanol is methyl alcohol, the monoalkylamine is monomethylamine, and the product is N,N'-dimethylterephthalamide.

5. The process of claim 1 in which the ester is diethylterephthalate, the alkanol is ethyl alcohol, the monoalkylamine is monoethylamine, and the product is N,N'-diethylterephthalamide.

6. The process of claim 1 in which the ester is dimethylisophthalate, the alkanol is methyl alcohol, the monoalkylamine is monomethylamine, and the product is N,N'-dimethylisophthalamide.

7. A process for preparing N,N'-dimethylterephthalamide which comprises mixing dimethylterephthalate with from 1 to 5 times its weight of methanolic mother liquor from a previous reaction mixture, said methanolic mother liquor containing not more than 15% of water; heating the mixture to a temperature of about 100° C. under autogenous superatmospheric pressure; adding from 2 to 2.5 moles of monomethylamine per mole of dimethylterephthalate in the mixture; thereafter maintaining said temperature and pressure of the reaction mixture for at least 15 minutes; cooling the reaction mixture to about 40° C.; separating the solid N,N'-dimethylterephthalamide from the mother liquor and washing the amide with water; and reusing the methanolic mother liquor for a subsequent cycle of the process.

8. A continuous process for preparing an N,N'-dialkylamide of an acid from the group consisting of isophthalic acid and terephthalic acid, said process comprising continuously dissolving an ester selected from the group consisting of dimethylisophthalate, dimethylterephthalate, diethylisophthalate, and diethylterephthalate in an alkanolic mother liquor from a previous reaction mixture wherein the ratio by weight of mother liquor to dialkyl ester is from 1 to 5 parts of mother liquor per part of ester, at 80 to 120° C. under autogenous superatmospheric pressure, subsequently continuously adding at least 2 moles of the corresponding monoalkylamine per mole of said ester, maintaining said temperature and pressure for at least 15 minutes thereafter, cooling the mixture to a temperature below the normal boiling point of said alkanol, separating the solid N,N'-dialkylamide from the reaction mixture and reusing the mother liquor in a subsequent cycle of the process.

References Cited by the Examiner

Fuller, Industrial and Engineering Chemistry, vol. 49, pages 722–723 (April 1957).

German Auslegeschrift, 1,130,802, June 7, 1962.

IRVING MARCUS, *Primary Examiner*.

NICHOLAS S. RIZZO, WALTER A. MODANCE,
*Examiners*.